Jan. 29, 1963  J. W. HARRISON  3,075,248
MOUNTING PLASTIC COVERING MATERIAL
Filed May 7, 1959

INVENTOR
JOHN W. HARRISON
BY Cushman, Darby & Cushman
ATTORNEYS 3,075,248
MOUNTING PLASTIC COVERING MATERIAL
John W. Harrison, Winchester, Mass., assignor to W. R. Grace & Co., Cambridge, Mass., a corporation of Connecticut
Filed May 7, 1959, Ser. No. 811,658
3 Claims. (Cl. 18—48)

This invention relates to a method of mounting flexible, heat shrinkable plastic materials in situations such as storm windows, weather shielding for building scaffolds, billboard and sign protection, and virtually any instance where it is desired to provide a panel of a thin film of heat shrinkable thermoplastic material, as well as to the articles so formed.

More particularly this invention has reference to an arrangement where the distinguishing physical properties of the plastic material are employed to facilitate its use in applications like those noted above.

Heat insulating devices characterized broadly as storm windows have long been a familiar and desirable feature in the construction industry. Patents such as the Flanagan patent, 2,009,917 illustrate that it has been proposed to employ flexible transparent materials for such purpose.

However, from the prior art, it is apparent that the installation and mounting of such plastic materials has presented many serious problems.

Because of the pliability of such plastic materials, the handling and installation is typical of these problems. Consequently the materials have either had to be permanently mounted within or on a frame so as to have a convenient article of manufacture and installation. Another alternative proposed in the art has been to work with such plastic materials on rollers and to modify the window frame construction so as to permit the mounting of said rollers at the top of the window frame in a manner similar to that of conventional window shades.

These cumbersome measures of mounting said plastic material have been found necessary in the art because once in position as a storm window the plastic material is expected to remain taut and wrinkle-free to provide a closed insulating air space between the glass window and the plastic paneling.

Similarly problems have risen in conjunction with the application of such plastic materials as weather shielding for building scaffolding. Such weather shielding has become a familiar sight at construction projects. It is evident that there is a need for having a material that can be installed into position with great ease and facility and which will possess other desirable properties such as high strength.

An object of this invention is to provide a novel method of mounting plastic films or panels for storm windows, billboard and sign protection, weather shielding for scaffolds, etc., where there is desired a wrinkle-free, taut, transparent window.

Another object of the invention is to provide an improved method of mounting a heat shrinkable film of the character more fully hereinafter described.

A further object of the present invention is to provide a storm window of a flexible character which may be secured directly to the casement of an ordinary window.

Various other objects will be apparent from the description following and from consideration of the accompanying drawings.

By this invention applicant has provided both a heat shrinkable plastic material and a method of mounting said plastic material wherever these objects are obtained.

Generally the invention comprises a unique method of mounting a heat shrinkable plastic material, comprising the steps of draping a sufficient amount of said heat shrinkable material over the area desired to be enclosed or covered, securing a strip, i.e. a batten, or similar means by a conventional manner, i.e. nailing, tacking, pasting, gluing, around the edge of the film leaving a border of said film outside the strip, and heat shrinking this surplus material before shrinking the central portion. This forms a thickened edge which will not pull under the secured batten and a wrinkle-free interior portion.

In the preferred form of the invention, there is utilized an irradiated biaxially oriented polyethylene which gives a crystal clear, water white window having considerable strength. The polyethylene film employed has been irradiated to an extent of 2 to 100 megarad, preferably 6 to 20 megarad. The irradiation can be accomplished in conventional fashion, e.g., by the use of a high voltage resonant transformer, such as the 2,000,000 volt General Electric Resonant Transformer, or high energy particle generators of 50,000 to 50,000,000 volts or a Van de Graaff electron accelerator. In addition to the use of electrons, there can be employed beta rays, gamma rays, e.g., by employing cobalt 60, etc. There can be employed any of the irradiation procedures disclosed in Baird application, Serial No. 713,848, filed February 7, 1958, now Patent No. 3,022,543, issued February 27, 1962 or Rainer Patent No. 2,877,500, for example. The entire disclosures of the Baird application and Rainer patent are hereby incorporated by reference.

The biaxial orientation is normally carried out to an extent of 100 to 700% longitudinally and 100 to 900% laterally. The biaxial stretching is preferably carried out by blowing irradiated polyethylene tubing as disclosed in the Baird application. The irradiated biaxially oriented polyethylene prepared by such a procedure has a high shrink energy, e.g., 100 to 1,000 p.s.i. at 96° C.

There can be employed as the starting polyethylene for the irradiation procedure high, low or medium density polyethylene prepared by low or high pressure techniques. The starting polyethylene can have a molecular weight of 7,000 or 12,000 or 19,000 or 21,000 or 24,000 or 35,000 or even higher.

In place of irradiated polyethylene, there can be employed similarly irradiated polypropylene and, in some instances, biaxially oriented unirradiated polypropylene. In general, higher temperatures are required to shrink the polypropylene.

In the illustrative examples discussed hereinafter there was employed Alathon 14 (polyethylene, molecular weight about 20,000 density 0.916) which has been irradiated to an extent of 12 megarad and has then been stretched 350% longitudinally and 350% laterally and has a shrink energy of 250 p.s.i. at 96° C.

Figure 2:
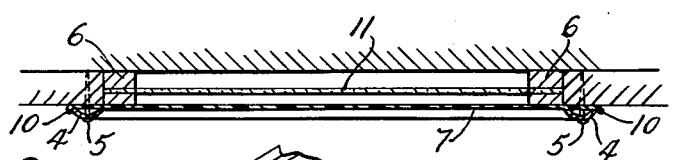
FIGURE 2 is a general cross-sectional view of the installed storm window taken along line 2—2 in FIGURE 1, and looking in the direction of the arrows.
Figure 3:
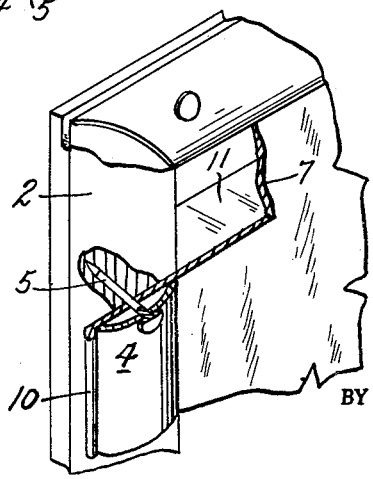
FIGURE 3 is a partial perspective view of a corner of said installed storm window clearly representing the elements of the invention.

Referring now in detail to the drawings which show a presently preferred embodiment of the invention, numeral 1 designates the exterior of a house which is provided with an ordinary window casement or frame the vertical and horizontal members of which are indicated generally by numerals 2. This casement furnishes the housing for an ordinary window construction including window frames 6. Sheets of glass 11 (FIGS. 2, 3)

are held in frames 6 in any suitable and well-known manner.

The irradiated, biaxially oriented polyethylene film indicated generally as 7, is applied over the window frame area and secured in place by the curved metal strips 4 which are in turn securely affixed by nails or tacks 5. The shrink energy of this film is such that it will pull out from under a normal inexpensive batten and tear away from tacks. It will be observed that the metal strips have a concave configuration pressing towards the window frame. An advantage of such curved metal strips lies in the fact that as the tension caused by the shrinkage in the general central area 7 increases, the grip of the metal strip becomes more firm in the vicinity of the shrunken film bead 10.

Figure 1:
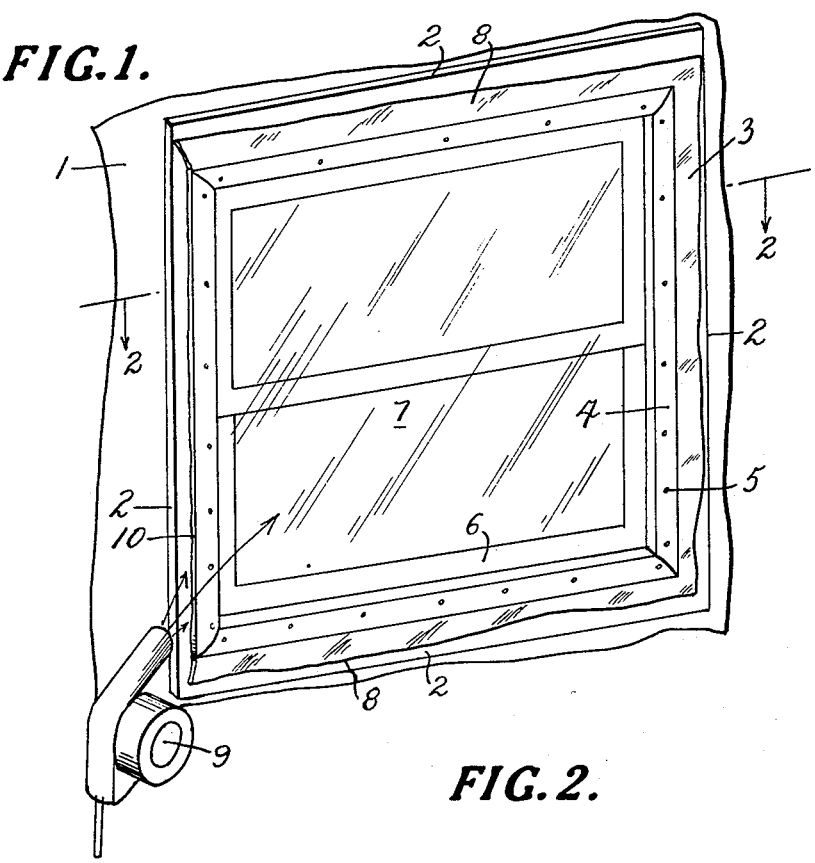
FIGURE 1 is a fragmentary perspective view of an ordinary window casement provided with an improved storm window secured to the exterior of the casement, and the figure also illustrates the method of application and heat shrinking involved.

Attention is directed to FIGURE 1 wherein numeral 3 indicates the surplus of about ½ to 1 inch of film which is to extend beyond the strips 4. Upon the application of heat from a suitable source 9, directed to this outer circumferential area, a thickened edge or bead 10 is formed. Once the reinforcing edge or bead is formed along the circumferential edges, heat is directed to the central portion 7 defined by said metal strips whereby it too shrinks resulting in the formation of a taut, wrinkle-free transparent window.

The invention can also be employed in numerous other applications such as floor coverings in model homes, protective covers for billboards and signs, constructing screens for green house uses as well as in construction locations. It will be observed that according to the invention there is provided a panel of heat shrinkable plastic, specifically irradiated biaxially oriented polyethylene material, a securing strip is fastened around the edges thereof, while at the same time being sure to have a surplus of said heat shrinkable film outside of said fastening means, to form a bead adjacent said securing strip directing heat thereto, thereby forming the bead and then shrinking the remaining central portion.

The invention can also be employed in other applications such as mounting clear heat-shrinkable film over paintings or other expensive works of art which are on display, as a showcase cover or a temporary window or door while awaiting repair.

The use of heat-shrinkable film which can be drawn taut and wrinkle-free after fastening has a great advantage over other film or protective coverings which must be drawn taut and wrinkle-free as they are being fastened. Obviously, the taut wrinkle-free condition of a clear covering material will add to its clarity and therefore its desirability in some applications.

The looseness of the protective covering will increase its vulnerability to damage by the whipping action of the wind. Heat shrinking plastic covers which can be drawn tight with the application of heat over its surface after it has been fastened in the manner of the present invention will easily overcome this disadvantage.

What is claimed is:

1. A method for mounting a film of heat-shrinkable transparent plastic material comprising the steps of positioning said film over the area to be protected, affixing a rigid fastening and restraining means around the periphery of said area but allowing a surplus of film to extend beyond said fastening means, heat shrinking said surplus film to form a thickened edge portion outside but adjacent said fastening means, and thereafter heat shrinking the area of film defined within the fastening means.

2. The method of claim 1 wherein the heat-shrinkable material comprises an irradiated biaxially oriented polyethylene.

3. A method according to claim 2 wherein the area of the film within the fastening means is heated sufficiently to remove substantially all wrinkles therein and form a taut surface.

References Cited in the file of this patent

UNITED STATES PATENTS

| | | |
|---|---|---|
| 2,080,394 | Ballantyne | May 18, 1937 |
| 2,587,330 | Jones | Feb. 26, 1952 |
| 2,817,399 | Donaldson et al. | Dec. 24, 1957 |
| 2,877,500 | Rainer et al. | Mar. 17, 1959 |
| 2,943,676 | Grenci | July 5, 1960 |